United States Patent
Barriety et al.

(10) Patent No.: US 10,732,631 B2
(45) Date of Patent: Aug. 4, 2020

(54) METHOD FOR ALLEVIATING AND PROTECTING LOADS FOR AN AIRCRAFT

(71) Applicant: Airbus Operations (S.A.S.), Toulouse (FR)

(72) Inventors: Bernard Barriety, Levignac (FR); Robin Vernay, Tournefeuille (FR); Fabio Vetrano, Toulouse (FR); Davide Cantiani, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 149 days.

(21) Appl. No.: 16/121,226

(22) Filed: Sep. 4, 2018

(65) Prior Publication Data

US 2020/0026275 A1 Jan. 23, 2020

(30) Foreign Application Priority Data

Sep. 5, 2017 (FR) .................................... 17 58170

(51) Int. Cl.
| | |
|---|---|
| *G05D 1/00* | (2006.01) |
| *B64C 13/04* | (2006.01) |
| *B64C 13/16* | (2006.01) |
| *B64D 43/00* | (2006.01) |
| *G01M 9/06* | (2006.01) |
| *G05D 1/06* | (2006.01) |

(52) U.S. Cl.
CPC ............ *G05D 1/0066* (2013.01); *B64C 13/16* (2013.01); *B64D 43/00* (2013.01); *G01M 9/06* (2013.01); *G05D 1/0615* (2013.01)

(58) Field of Classification Search
CPC .... B64C 13/16; G05D 1/0066; G05D 1/0615; G01M 9/06; B64D 43/00
USPC ............................................................. 701/3
See application file for complete search history.

(56) References Cited

U.S. PATENT DOCUMENTS

| | | | |
|---|---|---|---|
| 5,082,207 A | 1/1992 | Tulinius | |
| 2008/0265104 A1 | 10/2008 | Fabre-Raimbault et al. | |
| 2009/0018703 A1* | 1/2009 | Mangalam | G01M 9/06 700/282 |
| 2013/0187009 A1* | 7/2013 | Golling | B64C 21/04 244/203 |
| 2013/0206919 A1* | 8/2013 | Shachor | B64C 39/022 244/23 A |
| 2016/0357191 A1* | 12/2016 | Calcedo | G05D 1/0066 |

* cited by examiner

*Primary Examiner* — Kenneth J Malkowski
(74) *Attorney, Agent, or Firm* — Jenkins, Wilson, Taylor & Hunt, P.A.

(57) ABSTRACT

A method for alleviating and protecting loads of a lifting surface of an aircraft based on control of structural distortions of the lifting surface. The lifting surface includes a control surface, a maneuvering system for displacing the control surface and sensors which measure a dimensional characteristic linked to the distortion of the lifting surface. The method acquires characteristic data linked to the distortion of the lifting surface, determines a set of values of the shape, analyzes the value of the strain attribute and compares the set of values characterizing the shape to the values of the tolerance interval associated with the lifting surface. If the set of values characterizing the shape is outside of the interval, the process triggers an activation of the maneuvering system to displace the control surface from an initial position in order to alleviate the loads on the lifting surface.

6 Claims, 3 Drawing Sheets

METHOD FOR ALLEVIATING AND PROTECTING LOADS FOR AN AIRCRAFT

CROSS-REFERENCE TO RELATED APPLICATION

This application claims the benefit of and priority to French patent application number 17 58170 filed on Sep. 5, 2017, the entire disclosure of which is incorporated by reference herein.

TECHNICAL FIELD

The disclosure herein relates to a method for alleviating and protecting loads for an aircraft.

BACKGROUND

In order to minimize the loads that are applied on a lifting surface of an aircraft during a maneuver or an atmospheric disturbance, it is known practice to implement a method which makes it possible to protect the structure of the aircraft by alleviating the loads. In fact, in maneuvering or in turbulence, the lifting surfaces of the aircraft undergo structural distortions, for example flexural and torsional, that can weaken the structure of the aircraft.

The methods currently implemented are based on load alleviation laws of a lifting surface, commonly referred to as "Maneuver Loads Alleviation" and "Gust Loads Alleviation". These laws are devised from computations or theoretical simulations of loads, from flight parameters of an aircraft in a maneuver or an atmospheric disturbance. The simulations make it possible to determine thresholds of activation of these laws which are a function of theoretical flight parameter values. The latter can be the weight of the aircraft, the speed, the flight altitude, the Mach number, etc. The laws are activated when a set of flight parameter values measured during flight is equal to a set of flight parameter values determined in simulations. Subsequently, a control unit of the aircraft displaces or imposes a lock on the control surfaces associated with the lifting surface to reduce the loads thereon.

This solution is based on a theoretical behaviour of the aircraft in maneuvering or in turbulence and does not necessarily correspond to the real behaviour of the aircraft. Furthermore, this solution is time-consuming, because it requires new simulations to be carried out when the controls or the configuration of the aeroplane are modified in order to determine new theoretical activation thresholds. Furthermore, when the flight control laws or the configuration of the aircraft are modified, that entails a lengthy step of verification and adjustment of the load alleviation laws.

SUMMARY

The disclosure herein makes it possible to overcome the drawbacks of the prior art, by disclosing a method for alleviating and protecting loads for an aircraft whose activation is a function of the current shape of a lifting surface during a maneuver or a turbulence.

Hereinafter in the document, the term "distortion" will be used to denote a local distortion of a lifting surface, such as a vertical or torsional distortion of the lifting surface at a given location and the term "shape" will be used to denote a global distortion of the lifting surface, that is to say a distortion of the envelope of the lifting surface, of its form.

One object of the disclosure herein is to provide a method for alleviating and protecting loads for an aircraft which is based on the monitoring and the control of the current shape of the lifting surface concerned. In fact, the structural distortions of the lifting surfaces are proportional to the loads applied to the structure of the aircraft. Thus, when the loads applied to the structure of the aircraft increase, the flexural and torsional distortions of the lifting surface increase. The activation of the method for alleviating and protecting loads for an aircraft is thus a function of the current shape of the lifting surface concerned.

To this end, a method is disclosed herein for alleviating and protecting loads of a lifting surface of an aircraft comprising a control unit in which is stored an acceptable interval of tolerance of shapes for the lifting surface, the lifting surface comprising a fixed proximal end and a free distal end and being equipped with at least one control surface and a maneuvering system provided to displace the control surface relative to the lifting surface, the lifting surface also comprising a distal sensor fixed to the structure of the lifting surface in the vicinity of its distal end and a proximal sensor fixed to the structure of the lifting surface in the vicinity of its proximal end, each sensor being connected to the control unit and provided to measure a dimensional characteristic linked to the distortion of the lifting surface, the method for alleviating and protecting loads being wherein it comprises a first process and a second process, the first process consists in or comprises, for the control unit, assigning a value to the strain attribute according to whether the lifting surface is placed under controlled strain or not, and the second process comprises at least:

an acquisition step during which each sensor acquires characteristic data linked to the distortion to which the lifting surface is subjected and transmits these data to the control unit;

a computation step during which the control unit determines, from the duly transmitted data, a set of values characterizing a shape of the lifting surface, a first comparison step during which the control unit analyzes the value of the strain attribute;

if the value of the strain attribute is equal to the second value, the process is continued by a second comparison step during which the control unit compares the set of values characterizing the shape of the lifting surface to the values of the tolerance interval associated with the lifting surface;

if the set of values characterizing the shape lies within the interval, the process loops to the acquisition step; and if the set of values characterizing the shape is outside of the interval, the process comprises an alleviation step during which the control unit triggers an activation of the maneuvering system to displace the control surface from an initial position in order to alleviate the loads on the lifting surface.

Such a method is thus based on the analysis of the real shape of the lifting surface and no longer on a modelling, which makes it possible to obtain a simpler and more robust method.

Advantageously, the method comprises, after the alleviation step, a timer step during which the position of the control surface remains held for a defined time, then a return step during which the control unit triggers an activation of the maneuvering system to displace the control surface in order to revert to the initial position.

Advantageously, the timer step is 5 seconds.

Advantageously, the second comparison step is followed, when the set of values characterizing the shape lies within the interval, by a step of computation of the gradient during which the control unit computes a gradient between the current set of shape values and a prior set of shape values, then by a fourth comparison step during which the control unit compares the gradient to a set of threshold values and if the gradient is below the threshold, the process loops to the acquisition step and if the gradient is above the threshold, the process is continued by the alleviation, timer and return steps.

Advantageously, the first process comprises:
an instruction substep during which a maneuvering order is delivered;
a transmission substep during which the maneuvering order is transmitted to a flight computer of the aircraft; and
a maneuvering substep during which the flight computer controls the maneuver corresponding to the maneuvering order.

Advantageously, the aircraft comprises an incidence probe arranged at the nose of the aircraft, and the first process comprises:
a substep of estimation of a turbulence during which the control unit estimates the value of an incidence angle linked to a disturbance due to the wind;
an additional comparison substep during which the control unit compares the duly estimated value of the angle of incidence to a threshold value;
if the value of the incidence angle is below the threshold value, the first value is assigned to the value of the attribute; and
if the value of the incidence angle is above the threshold value, the second value is assigned to the value of the attribute.

BRIEF DESCRIPTION OF THE DRAWINGS

The features of the disclosure herein mentioned above, and others, will become more clearly apparent on reading the following description of an exemplary embodiment, the description being given in relation to the attached, example drawings, in which.

DETAILED DESCRIPTION

Figure 1:
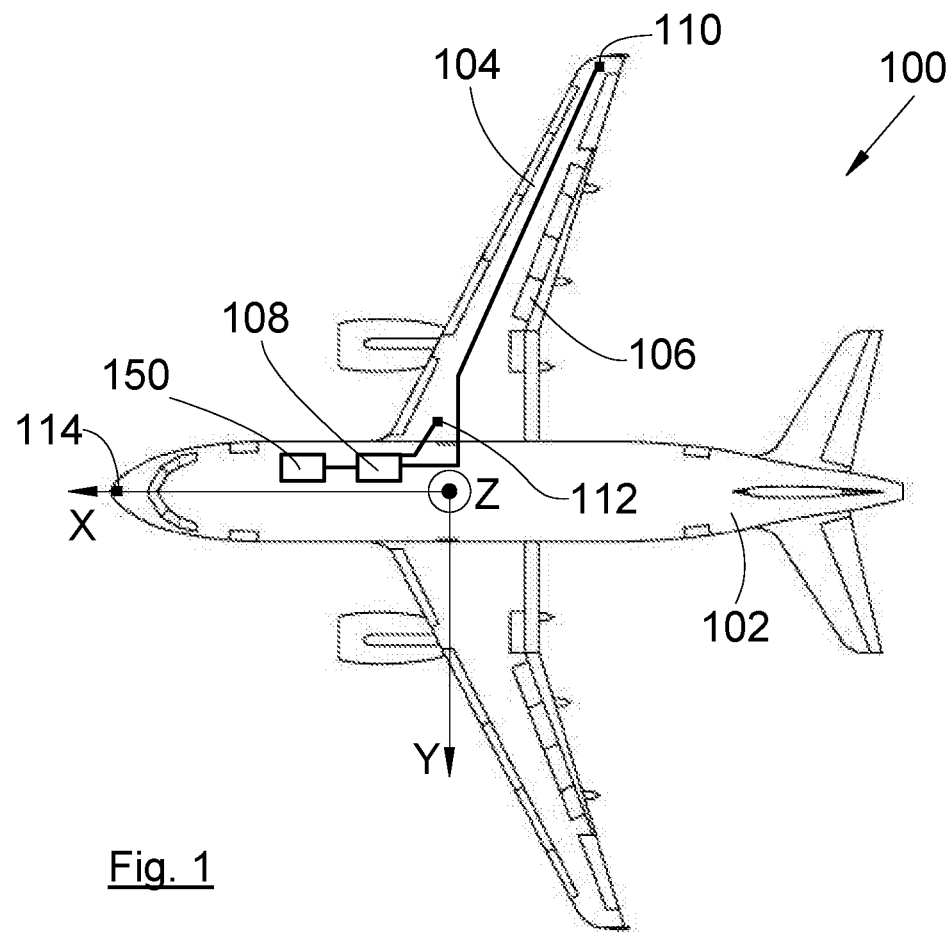
FIG. 1 shows a plan view of an aircraft according to the disclosure herein.

FIG. 1 shows an aircraft 100 in plan view.

In the following description, and by convention, X denotes the longitudinal axis of the aircraft 100 or roll axis, oriented positively in the direction of advance of the aircraft 100, Y denotes the transverse axis or pitch axis of the aircraft 100 which is horizontal when the aircraft is on the ground, and Z denotes the vertical axis or vertical height or yaw axis when the aircraft is on the ground, these three directions X, Y and Z being mutually orthogonal.

The aircraft 100 comprises a fuselage 102 on either side of which is located a wing which constitutes a lifting surface 104 of the aircraft 100.

In the following description, the method for alleviating and protecting loads is applied to the wing 104 which is starboard, but it applies equally to any other lifting surface 104 of the aircraft 100, such as the horizontal and vertical tail plane. Each lifting surface 104, and in particular the wing, is fixed by a proximal end to a structure of the fuselage 102, whereas the other end of the lifting surface 104 constitutes a distal end which is free, that is to say that it is not fixed.

Figure 2:
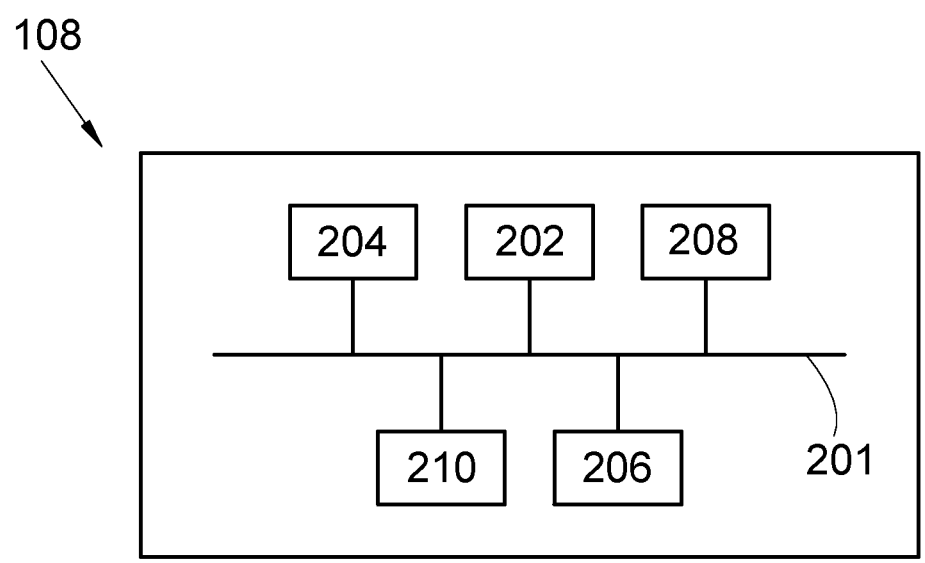
FIG. 2 shows a system implementing a method for alleviating and protecting loads according to the disclosure herein.

The aircraft 100 is also equipped with a control unit 108 which is represented in more detail in FIG. 2 and which comprises, among other things, a processor 202.

The lifting surface 104 is equipped with at least one control surface 106 which is provided to be displaced or locked relative to the lifting surface 104. To this end, the lifting surface 104 is equipped with a maneuvering system, such as, for example, a motor or an actuator, which is controlled by the control unit 108 and which is provided to displace the control surface 106 relative to the lifting surface 104.

The control unit 108 comprises, linked by a communication bus 201: the processor 202 or CPU (Central Processing Unit); a random access memory RAM 204; a read only memory ROM 206; a storage unit 208 such as a hard disk; at least one communication interface 210, allowing the control unit 108 to communicate with the other elements of the aircraft 100, such as, for example, the maneuvering system of the control surface 106 and the sensors which will be described hereinbelow.

The processor is capable of executing instructions loaded into the RAM from the ROM, from an external memory (not represented), from a storage medium, or from a communication network. When the equipment is powered up, the processor is capable of reading instructions from the RAM and of executing them. These instructions form a computer program causing the implementation, by the processor, of all or some of the algorithms and steps described hereinbelow.

All or some of the algorithms and steps described hereinbelow can be implemented in software form by execution of a set of instructions by a programmable machine, for example a DSP (Digital Signal Processor) or a microcontroller, or be implemented in hardware form by a machine or a dedicated component, for example an FPGA (Field-Programmable Gate Array) or an ASIC (Application-Specific Integrated Circuit).

The aircraft 100 also comprises a flight computer 150. Depending on the case, the control unit 108 forms part of the flight computer 150 or it is in communication therewith.

The aircraft 100 also comprises at least one distal sensor 110 for measuring a dimensional value characteristic of the distortion of the lifting surface 104, such as, by way of nonlimiting examples, an inclinometer, an accelerometer, an inertial unit or an optical fibre and at least one proximal sensor 112 for measuring a value characteristic of the rigid movements of the aircraft 100, such as, by way of example, an inertial reference system. The distal sensor 110 is fixed to the structure of the lifting surface 104 in the vicinity of its distal end. According to one embodiment, several distal sensors 110 can be positioned along the lifting surface 104.

The proximal sensor 112 is fixed to the fuselage 102 of the aircraft 100 or to the structure of the lifting surface 104 in the vicinity of its proximal end. Each of the sensors 110 and 112 is connected to the control unit 108.

The placement of the distal sensor 110 in the vicinity of the distal end of the lifting surface 104 makes it possible to capture a dimensional measurement linked to the current distortion of the lifting surface 104 at this distal end. For example, when the lifting surface 104 is a wing, the distal sensor 110 can be positioned at the wing end, that is to say at the point where the distortions in maneuvering or in turbulence are the greatest.

The placement of the proximal sensor 112 in the vicinity of the proximal end of the lifting surface 104 or on the fuselage 102 makes it possible to determine the rigid movements of the aircraft 100. Furthermore, distortions of the lifting surface 104 at this location are the smallest and are even non-existent.

The value captured by each sensor 110, 112 is representative of the distortion of the lifting surface 104 at the sensor 110, 112.

To determine the shape of the lifting surface 104, the data measured by the sensors 110, 112 are compiled in mathematical functions by the control unit 108. As a nonlimiting example, when the distal sensor 110 is an inclinometer and the proximal sensor 112 an inertial reference system, the sensors 110, 112 measure millivolts converted by mathematical methods into acceleration, thereby making it possible to determine an angle of distortion between a position at rest of the lifting surface 104 and a position under strain, that is to say when loads are applied to the surface 104. From the angle of distortion, it is thus possible to determine the span of the distortion and therefore the flexural shape of the lifting surface 104. The proximal sensor 112 makes it possible, in addition, to subtract the physical parameters of the aircraft conditioned by operation of the aircraft. It is, furthermore, possible to compile different data from the sensors 110, 112, thereby making it possible for example to determine the bending and the twisting of the lifting surface 104. A digital representation of the shape of the lifting surface 104 comprising a set of values is thus obtained. These methods are widely known to the person skilled in the art and will not be detailed more.

According to a variant embodiment, the shape of the lifting surface 104 can be determined by photogrammetry. The proximal sensor 112 can consequently be an image capture means, such as a camera for example, and the distal sensor 110, a target. The proximal sensor 112 consequently triggers the acquisition of a digital representation such as an image of the lifting surface 104 and of the target and compares it to a reference image taken when the lifting surface 104 was at rest. The analysis of the two images by approaches known to the person skilled in the art, to determine the variation of the location of the target, that is to say of the distal sensor 112, makes it possible to determine the shape of the lifting surface 104.

In the context of the subject matter herein, a shape tolerance interval is computed for the lifting surface 104, more particularly at the time of the design thereof. This interval characterizes the limit shape or the envelope of the maximum distortions that the lifting surface 104 can withstand. This interval is limited by a positive shape and a negative shape and is stored in the control unit 108, and more particularly in the read-only memory 206. The positive shape and the negative shape are, respectively, a set of values of the positive distortions and of the negative distortions of the lifting surface 104, without risks of degradation when the lifting surface 104 is subjected to positive or negative loads, for example under 2.5G and −1G.

To take account of maneuvering dynamics and the time of activation of the method for alleviating and protecting loads, the values of the tolerance interval can be reduced by a margin equal, for example, to 10%.

The tolerance interval is specific to each aircraft model 100 and is linked to the limit loads acceptable by the structure of the lifting surface 104 and is linked to the envelope of shapes within which the shape of the lifting surface 104 must remain to guarantee the structural integrity thereof.

For each type of sensor 110, 112, the values captured by each sensor 110, 112 make it possible to determine a set of values characterizing the current shape of the lifting surface 104 and therefore the value of the local distortion at a distal sensor 110, which is compared to the associated value of the tolerance interval, which, for example, for a long-haul aircraft, extends from −1.1 m to +2.7 m for a distal sensor 110 positioned at the end of a wing 104.

A strain attribute is stored in a random access memory of the flight computer 150 or of the control unit 108, for example in the form of a flag or of an integer. This strain attribute can take two values, namely a first value corresponding to the case where the lifting surface 104 is not stressed, for example when no maneuver is in progress or the lifting surface 104 is not subject to turbulences, or, a second value corresponding to the case where the lifting surface 104 is stressed, for example, in a maneuver of the aircraft 100 or when the lifting surface 104 is subject to turbulences.

Thus, the value of the strain attribute makes it possible to signal to the control unit 108 that the lifting surface 104 is placed under controlled or uncontrolled strain.

The method for alleviating and protecting loads comprises a first process and a second process which run in parallel. The first process consists in or comprises continuously determining the value of the strain attribute and during this first process the control unit 108 assigns a value to the strain attribute depending on whether the lifting surface 104 is placed under controlled strain or not, that is to say either the second value or the first value. More specifically, the control unit 108 assigns a first value to the strain attribute if the lifting surface 104 is not placed under controlled strain or a second value to the strain attribute if the lifting surface 104 is placed under controlled strain.

The second process uses the value of the strain attribute to proceed with the alleviation or the protection of loads.

Figure 3:
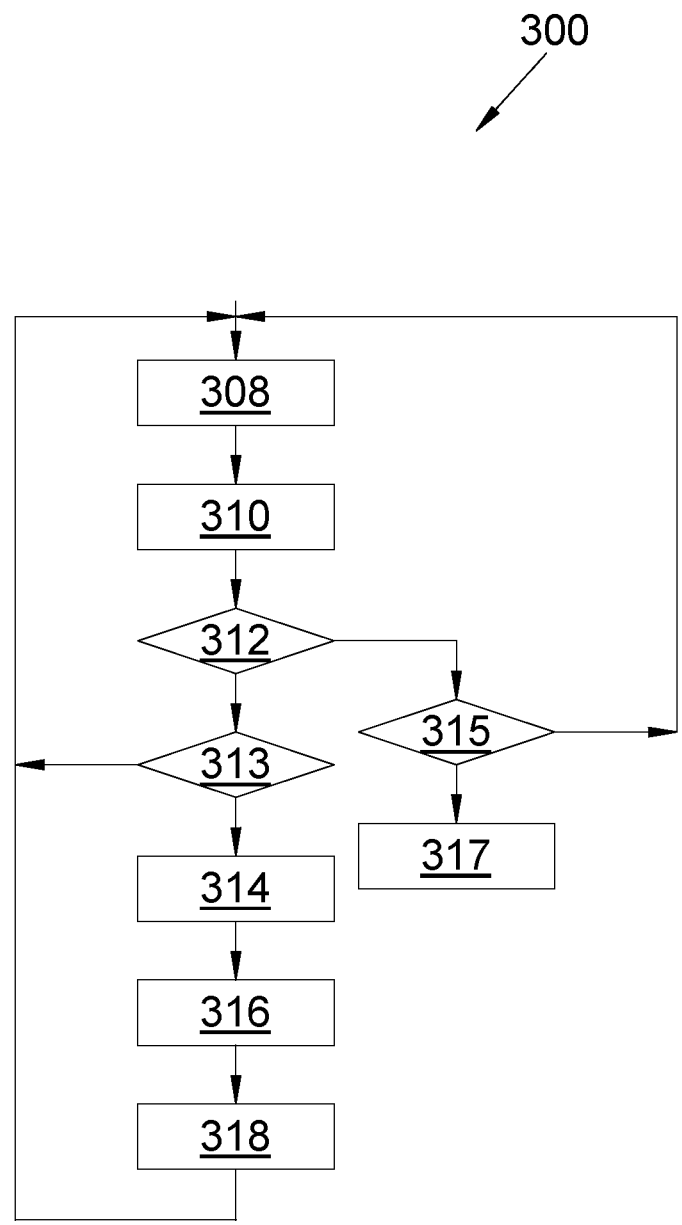
FIG. 3 shows a flow diagram of an embodiment of the disclosure herein.

FIG. 3 shows a flow diagram 300 of the second process. According to a first mode of use, the method is implemented in the context of a maneuver of the aircraft 100 which allows an alleviation of the loads being applied to the lifting surface 104. This alleviation and protection method consists in or comprises, globally, from a pilot control, monitoring to see that the shape of the lifting surface 104 does indeed remain within the interval and, when it departs therefrom, in easing the lifting surface 104 by actuating the control surface 106.

In the context of a maneuver of the aircraft 100, the first process consists in or comprises assigning, to the value of the strain attribute, the first value if no maneuver is engaged, and the second value if a maneuver is engaged.

When a maneuver is engaged, the second value is assigned to the strain attribute and the second process comprises:
- an instruction substep during which a maneuvering order is delivered by the pilot (for example, by an action on the control column) in order to control an action on the aircraft 100 such as, for example, a roll or flare maneuver;
- a transmission substep during which the maneuvering order is transmitted to the flight computer 150 of the aircraft 100; and
- a maneuvering substep during which the flight computer 150 controls the maneuver corresponding to the maneuvering order, such as, for example, a control surface lock (elevators, ailerons, etc.), and, during this maneuvering substep, the aircraft 100 is engaged in changing its direction, which generates aerodynamic and inertial forces which distort the structure of the lifting surface 104.

When no maneuver is engaged, the first value is assigned to the strain attribute.

The strain attribute is accessible to the second process.

The flow diagram 300 comprises:

- an acquisition step 308 during which each sensor 110, 112 acquires characteristic data linked to the distortion to which the lifting surface 104 is subjected and transmits these data to the control unit 108;
- a computation step 310 during which the control unit 108 determines, from the duly transmitted data, a set of values characterizing a shape;
- a first comparison step 312 during which the control unit 108 analyzes the value of the strain attribute;
- if the value of the strain attribute is equal to the second value attesting to a placement under controlled strain, the process is continued by a second comparison step 313 during which the control unit 108 compares the set of values characterizing the duly obtained shape to the corresponding values of the tolerance interval associated with the lifting surface 104;
- if the set of values characterizing the shape lies within the interval, the acceptable shape thresholds are not reached, no action on the control surfaces 106 is engaged and the process loops to the acquisition step 308; and
- if the set of values characterizing the shape is outside of the interval, the acceptable shape thresholds are exceeded and the process is continued by an alleviation step 314 during which the control unit 108 triggers an activation of the maneuvering system to displace the control surface 106 from an initial position in order to alleviate the loads on the lifting surface 104.

The second process then runs through a timer step 316 during which the position of the control surface 106 remains held for a defined time, then the process runs through a return step 318 during which the control unit 108 triggers an activation of the maneuvering system to displace the control surface 106 for a return to the initial position, then the process loops to the acquisition step 308.

According to a particular embodiment, if the strain attribute is equal to the first value attesting that there is no placement under controlled strain, the process is continued after the first comparison step 312 by a third comparison step 315 during which the control unit 108 compares the set of values characterizing the duly obtained shape to the corresponding values of the tolerance interval associated with the lifting surface 104;

if the set of values characterizing the shape lies within the interval, the acceptable shape thresholds are not reached and the process loops to the acquisition step 308; and if the set of values characterizing the shape is outside of the interval, the acceptable shape thresholds are exceeded and the process is continued by an alert step 317 during which an alarm message is sent to the flight computer 150 or the control unit 108 to signal that the lifting surface 104 has an abnormal or uncontrolled behaviour.

At the end of the maneuver, the first value can be assigned to the strain attribute to signal to the control unit 108 that the maneuver is terminated and that the lifting surface 104 is no longer placed under controlled strain.

A value characterizing a shape can be a voltage directly from the sensor, or another physical quantity, such as a length, an angle, etc., which corresponds to the value of the voltage of the sensor. Likewise, the intervals are gauged as a function of the type of the values characterizing a shape which are used.

The alleviation step 314 is based, for example, on an algorithm of PID (Proportional Integral Derivative) type which creates the command to be sent to the control surface 106.

The timer step 316 which is, for example, of the order of 5 seconds, prevents the appearance of aeroelastic coupling phenomena.

Taking account of the measurements actually linked to the distortion of the structure of the lifting surface 104 in flight makes it possible to have a physical representation of the local aerodynamic loading of the lifting surface 104, and therefore a simpler and more robust determination of the alleviation needs of the lifting surface 104.

According to a variant, the determined values of shapes or of distortions are stored in a memory of the flight computer 150 or of the control unit 108, and the difference between a current set of shape values and a prior set of shape values makes it possible to determine a shape gradient that makes it possible to follow the variations in distortion in the lifting surface 104.

When the gradient is nil, the lifting surface 104 undergoes no distortion and, conversely, when it is non-nil, the lifting surface 104 undergoes a distortion that is sudden and generally strong in amplitude, which can signify an imminent departure from the shape tolerance interval.

To anticipate this departure, the second comparison step 313 is followed, when the set of values characterizing the shape lies within the interval, by a step of computation of the gradient during which the control unit 108 computes the gradient between the current set of shape values and a prior set of shape values, then by a fourth comparison step during which the control unit 108 compares the gradient to a set of threshold values stored in a memory of the control unit 108, such as, for example, a zero ('0'), and if the gradient is below the threshold, the process loops to the acquisition step 308 and if the gradient is above the threshold, the process is continued by the alleviation 314, timer 316 and return 318 steps.

Likewise, according to a second mode of use, the method for alleviating and protecting loads is implemented in the context of structural distortions of the aircraft 100 in the case of gusts or turbulences when the aircraft 100 is in stabilized flight under 1 g and which allows for an alleviation of the loads being applied to the lifting surface 104. When gusts or turbulences act on the aircraft 100, in particular on the lifting surface 104, the latter is subject to aerodynamic and inertial forces which distort it. The aircraft 100 comprises a device or devices for determining a turbulence 114 arranged at the nose of the aircraft 100. Such device or devices can comprise, for example, an incidence probe, an altimeter, and/or any other electronic device known to the person skilled in the art from which the acquired data make it possible to detect the vertical wind. This alleviation and protection method consists in or comprises, globally, from a stabilized flight, measuring the disturbances due to the wind and in monitoring their effects on the shape of the lifting surface 104 in order for the shape to remain well within the tolerance interval and, when it departs therefrom, to ease the lifting surface 104 by actuating or locking the control surface 106.

As in the case of a maneuver, the strain attribute takes the first value when the aircraft 100, and therefore the lifting surface 104, is not subject to turbulences, and takes the second value when the aircraft 100, and therefore the lifting surface 104, is subject to turbulences.

The first process differs from the first process of the case of maneuvers by the fact that the first process consists in or comprises assigning the value of the strain attribute, the first value if no turbulence is detected, and the second value if turbulences are detected.

According to a particular embodiment, the first process comprises:
- a substep of estimation of a turbulence during which the control unit 108 estimates the value of an incidence angle linked to a disturbance due to the wind;
- an additional comparison substep during which the control unit 108 compares the duly estimated value of the incidence angle to a set of threshold values stored in a memory of the flight computer 150 or of the control unit 108, for example 1°;
- if the value of the incidence angle is below the threshold value, the first value is assigned to the value of the strain attribute; and
- if the value of the incidence angle is above the threshold value, the second value is assigned to the value of the strain attribute.

In fact, if the value of the incidence angle is below the threshold value, that is to say for low winds, the lifting surface 104 does not undergo controlled strains. Conversely, if the value of the incidence angle is above the threshold value, that is to say for high winds, the lifting surface 104 is subject to controlled strains.

The strain attribute used in turbulence can be the same as that used in maneuvering or be different.

The estimation substep takes account of the incidence value measured by the incidence probe 114 and, possibly, the values from other sensors, such as, for example, altitude, trim and slope sensors, to compute the value of an incidence angle linked to a disturbance due to the wind.

According to a particular embodiment, when the lifting surface 104 is the wing 104 and the control surface 106 is an aileron, the displacement of the aileron 106 will be a negative lock upwards whose angle will depend on the value of the incidence angle. For example, the lock angle will be −12° for an incidence angle greater than 3°.

The timer step 316 which is, for example, of the order of 5 seconds, prevents the occurrence of coupling phenomena.

Taking account of the measurements linked to the current distortions of the structure of the lifting surface 104 in flight makes it possible to have a physical representation of local aerodynamic loading of the lifting surface 104, and therefore a simpler and more robust determination of the alleviation needs of the lifting surface 104.

Like the method for alleviating and protecting loads in maneuvering, the gradient computation and analysis can be implemented in the case of turbulences.

According to one embodiment, the attributes characterizing a placement under strain of the lifting surface 104 respectively by a turbulence and by maneuver can be identical.

Figure 4:
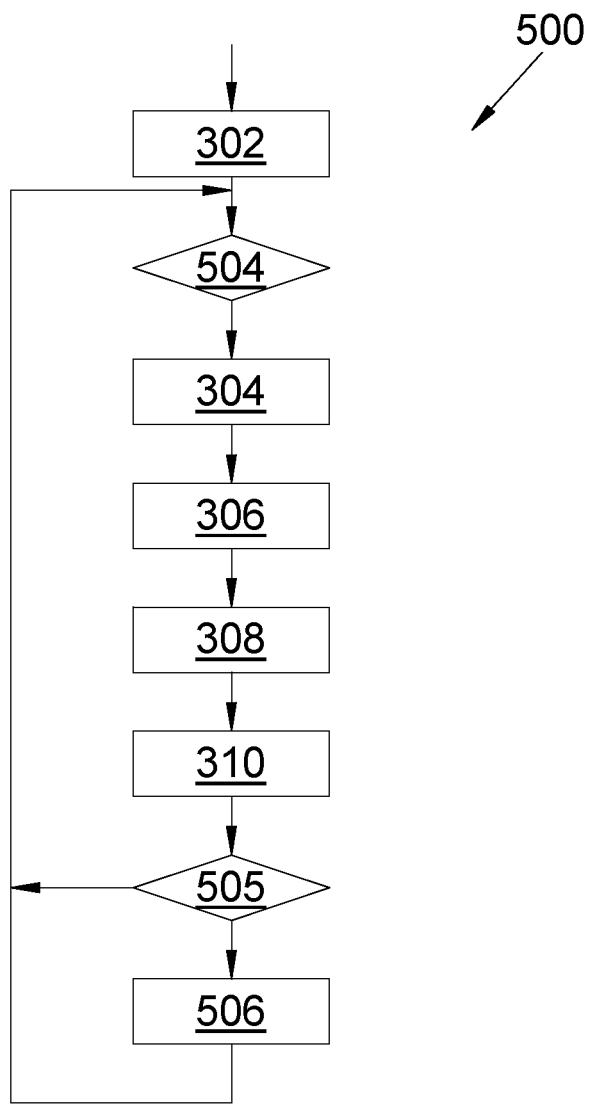
FIG. 4 shows a flow diagram of another embodiment of the disclosure herein.

FIG. 4 shows a flow diagram 500 of a method for alleviating and protecting loads implemented in the context of a limitation of the maneuverability of the aircraft 100 and which allows for an alleviation of the loads being applied to the lifting surface 104. This alleviation and protection method consists in or comprises, globally, from a pilot control, monitoring to see that the shape of the lifting surface 104 does indeed remain within the interval and, when it departs therefrom or approaches thereto, in limiting the maneuver requested in order to ease the lifting surface 104 by actuating the control surface 106.

The flow diagram 500 comprises:
- an instruction step 302 during which a maneuver order is delivered by the pilot (for example, an action on the control column or on the rudder bar) in order to control an action on the aircraft 100, such as, for example, a load factor control, a roll speed control or a side slip control;
- a preselection step 504 during which the control unit 108 compares the load factor corresponding to the maneuver order and a predetermined maximum load factor, and selects the lowest load factor out of the load factor corresponding to the maneuver order and the predetermined maximum load factor;
- a transmission step 304 during which the lowest load factor is transmitted to the flight computer 150 of the aircraft 100;
- a maneuvering step 306 during which the flight computer 150 controls the maneuver corresponding to the lowest load factor, and during this maneuvering step 306 the aircraft 100 engages in the maneuver by changing its trajectory, which generates aerodynamic and inertial loads which distort the structure of the lifting surface 104;
- an acquisition step 308 during which each sensor 110, 112 acquires characteristic data linked to the distortion to which the lifting surface 104 is subjected and transmits these data to the control unit 108;
- a computation step 310 during which the control unit 108 determines, from the duly transmitted data, a set of values characterizing a shape and computes the gradient between the set of shape values obtained and prior shape values stored in a memory of the control unit 108;
- a comparison step 505 during which the control unit 108 compares, on the one hand, the value characterizing the duly obtained shape to the corresponding values of the tolerance interval associated with the lifting surface 104, and, on the other hand, the duly computed gradient relative to a threshold gradient stored in a memory of the control unit 108;
- if the set of values characterizing the shape lies within the interval and the gradient is below the threshold gradient, the acceptable shape thresholds are not reached and the process loops to the preselection step 504; and
- if the set of values characterizing the shape lies within the interval and the gradient is above the threshold gradient, the acceptable shape thresholds are not yet exceeded but there is a risk and the process is continued by an assignment step 506, during which the control unit 108 assigns to the load factor a value computed from the roll speed, the side slip, the yaw speed, etc.

If the set of values characterizing the shape lies within the interval, the load factor will be greater than that induced by the order given by the pilot, in order to not limit the maneuver.

If the value characterizing the shape is equal to the value of the bounds of the interval, the computed value of the load factor will be lower than the load factor induced by the order controlled by the pilot, in order to limit the maneuver and to protect the lifting surface 104.

The process loops to the preselection step 504.

At the start of the maneuver, the value of predetermined maximum load factor of the preselection step 504 is assigned a high value. For example, in a longitudinal maneuver, the load factor value can be equal to 2.5 g, and is therefore greater than the load factor induced by the maneuver order given by the pilot. It is therefore disregarded in order for the requested maneuver to be engaged and the predetermined maximum load factor is then obtained in the assignment step 506.

Taking account of the measurements actually linked to the distortion of the structure of the lifting surface 104 in flight makes it possible to optimize the maneuverability of the aircraft 100 relative to its structural dimensioning. The triggering of the protection takes place when the current shape approaches the limit shape.

The disclosure herein makes it possible to consider each lifting surface 104 of the aircraft independently. Furthermore, the load alleviation laws are independent of the flight control laws of the aircraft and of the flight parameters.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for alleviating and protecting loads of a lifting surface of an aircraft comprising a control unit in which is stored an acceptable interval of tolerance of shapes for the lifting surface, the lifting surface comprising a fixed proximal end and a free distal end and being equipped with at least one control surface and a maneuvering system provided to displace the control surface relative to the lifting surface, the lifting surface also comprising a distal sensor fixed to a structure of the lifting surface in a vicinity of its distal end and a proximal sensor fixed to the structure of the lifting surface in the vicinity of its proximal end, each sensor being connected to a control unit and configured to measure a dimensional characteristic linked to distortion of the lifting surface, the method for alleviating and protecting loads comprising:
    a first process and a second process, wherein the first process comprises, for the control unit, assigning a first value to a strain attribute if the lifting surface is not placed under controlled strain or a second value to the strain attribute if the lifting surface is placed under controlled strain, and wherein the second process comprises at least:
        an acquisition step during which each sensor acquires characteristic data linked to the distortion to which the lifting surface is subjected and transmits these data to the control unit;
        a computation step during which the control unit determines, from the duly transmitted data, a set of values characterizing a shape of the lifting surface;
        a first comparison step during which the control unit analyzes the value of the strain attribute;
        if the value of the strain attribute is equal to the second value, the process is continued by a second comparison step during which the control unit compares the set of values characterizing shape of the lifting surface to values of the tolerance interval associated with the lifting surface;
        if the set of values characterizing the shape lies within the interval, the process loops to the acquisition step; and
        if the set of values characterizing the shape is outside of the interval, the process comprises an alleviation step during which the control unit triggers an activation of the maneuvering system to displace the control surface from an initial position, in order to alleviate the loads on the lifting surface.

2. The method according to claim 1, comprising, after the alleviation step, a timer step during which position of the control surface remains held for a defined time, then a return step during which the control unit triggers an activation of the maneuvering system to displace the control surface, in order to revert to the initial position.

3. The method according to claim 2, wherein the timer step is 5 seconds.

4. The method according to claim 1, wherein the second comparison step is followed, when the set of values characterizing the shape lies within the interval, by a step of computation of the gradient during which the control unit computes a gradient between the current set of shape values and a prior set of shape values, then by a fourth comparison step during which the control unit compares the gradient to a set of threshold values and if the gradient is below the threshold, the process loops to the acquisition step and if the gradient is above the threshold, the process is continued by the alleviation, timer and return steps.

5. The method according to claim 1, wherein the second process comprises:
    an instruction substep during which a maneuvering order is delivered;
    a transmission substep during which the maneuvering order is transmitted to a flight computer of the aircraft; and
    a maneuvering substep during which the flight computer controls the maneuver corresponding to the maneuvering order.

6. The method according to claim 1, wherein the aircraft comprises an incidence probe arranged at a nose of the aircraft, and wherein the first process comprises:
    a substep of estimation of a turbulence during which the control unit estimates a value of an incidence angle linked to a disturbance due to the wind;
    an additional comparison substep during which the control unit compares the duly estimated value of the incidence angle to a threshold value;
    if the value of the incidence angle is below the threshold value, the first value is assigned to the value of the strain attribute; and if the value of the incidence angle is above the threshold value, the second value is assigned to the value of the strain attribute.

* * * * *